United States Patent [19]

Melikian

[11] 4,318,500
[45] Mar. 9, 1982

[54] CAP FOR DISPENSING PREDETERMINED QUANTITIES OF FLOWABLE MATERIAL

[76] Inventor: Robert B. Melikian, 235 E. 51st St., New York, N.Y. 10022

[21] Appl. No.: 141,864

[22] Filed: Apr. 21, 1980

Related U.S. Application Data

[63] Continuation of Ser. No. 844,234, Oct. 21, 1977, abandoned.

[51] Int. Cl.³ .............................................. G01F 11/26
[52] U.S. Cl. .................................... 222/425; 222/454; 222/561
[58] Field of Search ............... 222/205, 448, 449, 454, 222/486, 457, 457.5, 425, 561

[56] References Cited

U.S. PATENT DOCUMENTS

| 313,666 | 3/1885 | Hazelton | 222/456 |
| 820,679 | 5/1906 | Studley | 222/425 X |
| 976,066 | 11/1910 | Gillette | 222/456 |
| 1,029,431 | 6/1912 | Elliott et al. | 222/561 X |
| 3,252,632 | 5/1966 | Hagenes | 222/449 |
| 4,079,859 | 3/1978 | Jennings | 222/454 X |

*Primary Examiner*—Robert J. Spar
*Assistant Examiner*—Frederick R. Handren
*Attorney, Agent, or Firm*—Arthur A. March

[57] ABSTRACT

A measuring and dispensing cap for a container internally divided into two compartments, one compartment being a tubular section in direct communication with the container and its contents and an offset extension from said tubular section; a wall partially dividing said tubular section from said offset extension to compartmentalize the cap; an aperture in the wall of said extension for the emission of flowable materials contained therein and a slide movably covering said aperture whereby when said container is tilted from an upright position flowable material therein passes through said passage section and a predetermined amount passes into said measuring section and is maintained therein when said container is returned to said upright position for emission through said outlet means.

6 Claims, 4 Drawing Figures

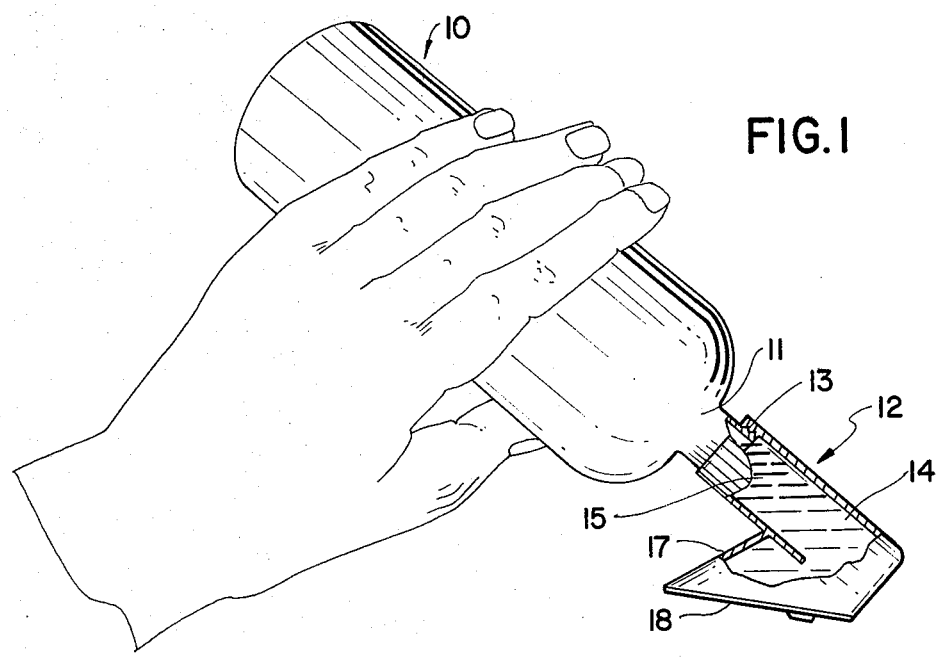
FIG. 1
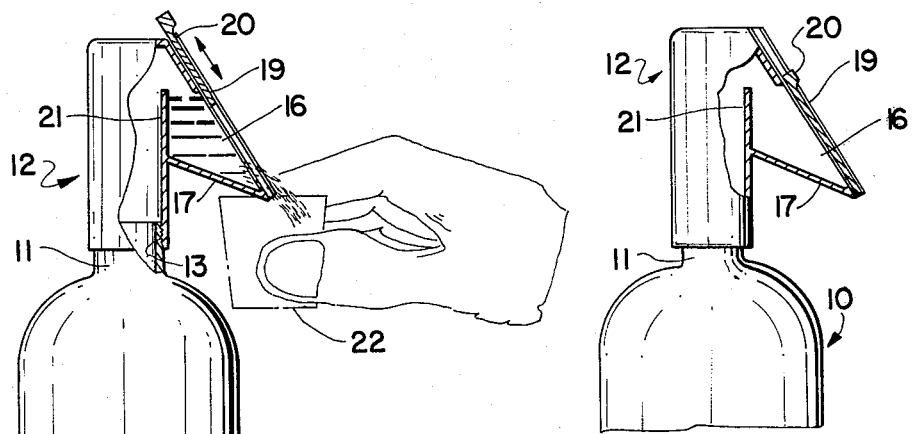
FIG. 2
FIG. 3
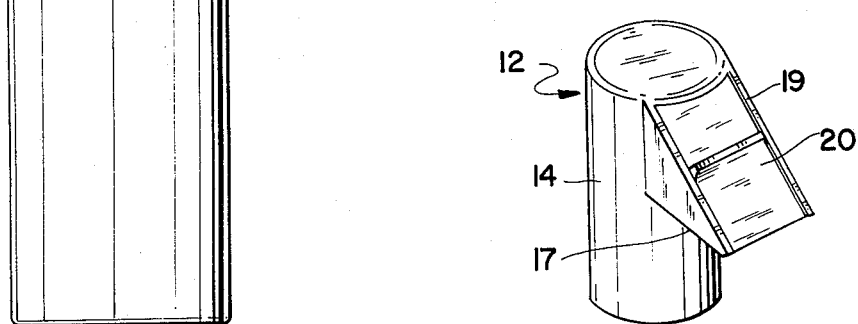
FIG. 4

CAP FOR DISPENSING PREDETERMINED QUANTITIES OF FLOWABLE MATERIAL

This is a continuation of copending U.S. application Ser. No. 844,234 filed Oct. 21, 1977, and now abandoned.

BACKGROUND OF THE INVENTION

There has been a long felt need for a simple, relatively inexpensive and accurate means for dispensing predetermined amounts of a flowable material such as liquid material which is maintained in direct relation with the container for the material itself.

Heretofore, several proposals have been made to provide a device which dispenses measured quantities of liquid some of which involve the bottle itself or the cap for the bottle. For example, in U.S. Pat. No. 236,997, the neck of the bottle itself is formed into an exotically curved housing adapted to contain a predetermined amount of liquid upon tilting. However, such structure is quite costly requiring as it does, a bottle of very unusual shape and furthermore, the dispensing arrangement is far from satisfactory in connection with the care required to provide only the appropriate amount for ultimate dispensing. Other patents seeking solutions to the aforesaid problem are as follows:

T. B. Russell U.S. Pat. No. 3,451,446
W. J. Goodrich U.S. Pat. No. 3,235,143
S. Malis et al. U.S. Pat. No. 3,254,808
J. C. Breneman U.S. Pat. No. 3,254,809
L. A. Godschalk, Jr. U.S. Pat. No. 3,369,713
A. Smith, Jr. U.S. Pat. No. 1,373,534

In each instance, the arrangement is either complex or does not provide means for preventing the return of the predetermined measured amount of liquid into the container or necessitates costly and expensive baffle arrangements or the like.

One such proposed construction, i.e. that of U.S. Pat. No. 3,451,446, has means which not only make it difficult to maintain the predetermined amount of liquid without returning into the bottle section, but also a portion of the neck of the bottle is required to be removed to dispense the predetermined amount of liquid with the consequent possibilities of loss of liquid, misplacement of the stop and untidy spillage.

Thus, the aforesaid problem has not been satisfactorily solved.

SUMMARY OF THE INVENTION

The present invention provides a unique, relatively inexpensive and novel solution to the problem. Basically, the invention provides a cap which may be readily applied to conventional containers without the necessity for modification of the containers in any way. The containers may thus be of glass or plastic and be provided with a threaded connection to the cap or the cap and containers may be frictionally engaged. Thus, the present invention provides a measuring and dispensing device which in no way requires any modification to currently available container and bottle constructions.

In essence, the measuring and dispensing device provides an integral unit preferably of rigid plastic or glass. One portion of the unit may be substantially tubular. Angularly disposed from the top of the tubular section is an extension. The extension is illustrated as being of substantially triangular shape, although it will be realized that any suitable configuration may be utilized for this section as well as the aforesaid tubular portion. A dividing wall is disposed over a predetermined length between the aforesaid tubular element and the extension which will hereinafter be designated as triangular shape merely to facilitate an understanding thereof. Thus, the measuring and dispensing device is compartmentalized with a predetermined amount of material such as liquid, being ultimately disposed in the triangularly shaped extension of the dispensing device or cap prior to its emission therefrom.

There is an aperture on one of the outer strips of the triangular shaped extension which is covered by a slidably movable plate so that when the extension compartment is filled with the predetermined amount of liquid, it is only necessary to slide the plate in such manner as to expose the aperture whereupon the liquid will be completely emitted from its contained portion. When the plate is closed, it is only necessary to tilt the bottle to fill the cap whereupon when the bottle is placed in its original position, the contents within the tubular portion of the cap return toward the base of the bottle while a triangularly shaped extension compartment maintains a predetermined amount of the flowing substance which is prevented from returning into the bottle by a compartmental wall.

There is thus provided a very efficient, economical unit which accepts and maintains a predetermined amount of the material which is unable to return into the bottle portion if appropriately handled prior to dispersing.

The following description and drawings, it will be understood, are solely to enhance the understanding of the invention without in any way limiting the invention to the specific forms illustrated and described.

BRIEF DESCRIPTION OF THE DRAWINGS

FIG. 1 is a perspective view partly in section, showing the measuring and dispensing cap in tilted position for accommodating a predetermined amount of flowable material;

FIG. 2 is a side view partly in section, showing the compartmentalized measuring and dispensing cap opened to permit the flow of material therefrom;

FIG. 3 is a side view partly in section, showing an empty dispensing and measuring cap;

FIG. 4 is a perspective view of the cap showing the sloping vertical wall of the dispensing and measuring cap.

DETAILED DESCRIPTION OF THE INVENTION

As illustrated in the drawings, a conventional bottle 10 having a neck portion 11 accommodates the cap 12 of the present invention. The securement of the cap to the bottle may be a threaded connection 13 as shown or any other type of engagement may be provided. The bottle, of course, may be of glass, plastic or any other suitable known material. The cap 12 which embodies the dispensing and measuring unit of the present invention may also be of any conventional material adapted to be secured to the bottle portion. However, relatively rigid plastic is preferred. The dispensing and measuring unit 12 is, as illustrated, compartmentalized. One section of the unit 14 is preferably tubular and is adapted to become filled with a portion of the contents 15 of the container 10 when the container is tilted as shown in FIG. 1. The tubular section 14 comprises the passage for flowable material to the offset extension housing 16.

The extension housing 16, preferably substantially in the form of a triangle, is an integral part of the dispensng cap 12 adjacent to the tubular section 14. The housing 16 has a bottom wall 17 angularly disposed from the tubular section. A side wall 18 joins the upper portion of the tubular section and the bottom wall 17 as illustrated. The side wall 18 has an aperture 19 which is adapted to be covered by a slide 20 which provides a seal around the edges of the aperture 19 in the wall 18.

In accordance with the present invention, and as aforesaid, an important feature thereof, the dispensing and measuring unit 12 is compartmentalized. The compartments are formed by the vertically extending common dividing wall 21 which, as shown, may be a portion of the wall forming the tubular section 14 interiorly of the extension housing 16. This structure divides the tubular section 14 and the triangularly shaped extension housing 16 along their common extent into communicating compartments. The housing 16 thus contains an upper passage portion above wall 21 and a lower outlet portion below wall 21 and containing the aperture 19 and the slide 20.

As a result of this unique and efficient construction, a barrier is provided between the triangularly shaped extension housing or measuring section 16 and the tubular section 12 which prevents the liquid or other substances which are accommodated by extension housing portion 16 from returning, via the tubular section 14, into the bottle 10. The compartment in the housing 16 is of a predetermined size so as to accommodate any desired amount of the substance to be dispensed from the bottle 10 in each individual use of the dispensing cap.

As illustrated in the drawings, tilting the bottle to the position shown in FIG. 1, the substance in the bottle will cause tubular section 12 to be filled and will partially fill the extension housing 16. The compartmentalization is such that when the bottle is returned to normal position, only a predetermined desired amount of flowable material remains within the extension housing 16 and the remainder of the material returns toward the base of the bottle 10. The material within the measuring section 16 cannot return into the bottle because of the uniquely structured wall 21.

When it is desired to emit the material in the measuring section 16 for use, it is only necessary to raise the slide or gate 20 whereupon the liquid will pass through the aperture 19 into a glass 22 or any other suitable receptacle. The dispenser of the present invention is so shaped that only the force of gravity is required to cause the liquid to pass from the extension housing 16. When the liquid has been emptied from the extension housing 16, the wall or gate may be returned to the position as shown in FIG. 3 in which it blocks the aperture 19 and seals around its edges. Thereafter, the process of filling the extension housing 16 with the predetermined desired amount of material may be repeated.

It will be seen, especially from FIGS. 2 to 4, that the slide 20 is a planar slide means disposed in substantially coplanar and flush sliding relation with the adjacent underlying external longitudinally extending planar wall portion of the extension housing 16 thereat which contains the aperture 19, so as to permit the slide 20 to be displaced in coplanar and flush sliding relation along such wall portion in an opening direction to expose the aperture and in the opposite direction to close and block such aperture and seal around its edges, e.g. as shown by the arrow in FIG. 2, i.e. all substantially compactly within the supporting general planar confines and external profile of the cap itself.

Such planar wall portion in effect is an outwardly and downwardly extending and upwardly facing wall portion containing the aperture 19 in upwardly facing relation therein. More specifically, the triangularly shaped measuring section 16 includes a downwardly facing and downwardly slanting bottom wall 17 and an upwardly facing and downwardly slanting side wall 18 together outwardly and downwardly extending in a direction away from the vertical dividing wall 21 and toward each other to form a closed apex, and the side wall 18 is provided with the planar wall portion containing such aperture.

It is to be understood that while the drawing and description refer to and illustrate a passage section 12 and a substantially triangularly shaped measuring section 16, the particular shapes involved do not limit the invention. For example, the exterior of the tubular section 14 may be rectangular and the extension housing 16 may be bulbous provided that the dispensing unit is properly compartmentalized to provide an area for accommodating and storing predetermined amounts of flowable material and prevent it from inadvertently returning into the bottle itself. Thus, variations and modifications may be made without departing from the spirit of the invention as defined in the appended claims.

What is claimed is:

1. Measuring and dispensing cap for a container comprising a housing having a passage section for the passage of flowable materials from the container and a measuring section for maintaining a predetermined amount of flowable material passing from the passage section, said measuring section having an upper passage portion and a lower outlet portion, a substantially vertical common wall internally of said housing partially dividing said passage section from said measuring section at the upper passage portion of the measuring section to compartmentalize said housing, said passage section, measuring section and vertical wall being interconnected, and outlet means in the lower portion of said measuring section for the emission of said flowable material from said measuring section including an outwardly and downwardly extending and upwardly facing planar wall portion containing an upwardly facing aperture, and a closure means disposed in substantially removable closing relation with said aperture, whereby when said container is tilted from an upright position, flowable material therein passes through said passage section and a predetermined amount passes at the upper passage portion into said measuring section and is maintained therein at the lower outlet portion when said container is returned to said upright position for emission through said outlet means in the upright position of the container upon removal of the closure means to open said aperture.

2. Cap according to claim 1 wherein said passage section, measuring section and vertical wall are integral.

3. Cap according to claim 1 wherein said passage section is tubular and said measuring section is substantially triangular.

4. Measuring and dispensing cap for a container, comprising an upright housing defining a closure for the container and having in partially coextensive adjacent relation therewithin a passage section for the passage of flowable materials from the container and a measuring section for maintaining a predetermined amount of flowable material passing from the passage section, said measuring section having an upper passage portion and a lower outlet portion, a substantially upright vertical common wall internally of said upright housing and formed of a portion of said passage section and partially dividing said passage section from said measuring section at the upper passage portion of the measuring section to compartmentalize said housing, said passage section, measuring section and upright vertical wall being interconnected along their common extent, said measuring section including a downwardly facing and slanting bottom wall and an upwardly facing and slanting side wall outwardly and downwardly extending in a direction away from the vertical wall and toward each other to form a closed apex, and upwardly facing outlet means in the lower portion of said measuring section for the emission of said flowable material from said measuring section including an outwardly and downwardly extending and upwardly facing planar wall portion in said side wall containing an upwardly facing aperture and a planar slide closure means disposed in substantially coplanar sliding relation with said planar wall portion thereat for displacement to open and close said aperture, whereby when said container is tilted from an upright position, flowable material therein passes through said passage section and a predetermined amount passes at the upper passage portion into said measuring section and is maintained therein at the lower outlet portion when said container is returned to said upright position for emission through said outlet means in the upright position of the container upon displacement of the planar slide means to open said aperture.

5. Cap according to claim 4 wherein the planar slide means is a movable slide disposed over said aperture in substantially coplanar and flush sliding relation with the planar wall portion for displacement in one direction to expose the aperture and in the opposite direction to close and block the aperture and seal around the edges thereof, and wherein the housing is an integral housing in which said passage section, measuring section and vertical wall are integral.

6. Measuring and dispensing cap for a container comprising an integral housing defining a unitary closure for the container and having a substantially tubular passage section for the passage of flowable materials from the container and a substantially triangular measuring section for maintaining a predetermined amount of said flowable material passing from the passage section, a substantially vertical wall internally of said housing and formed by a portion of said tubular section and partially dividing said passage section from said measuring section to compartmentalize said housing, said passage section, measuring section and vertical wall being integral, said triangular measuring section including a downwardly facing and slanting bottom wall and an upwardly facing and slanting side wall outwardly and downwardly extending in a direction away from the vertical wall and toward each other to form a closed apex, and said side wall having an external longitudinally extending planar wall portion containing an upwardly facing aperture for the emission of said flowable material from said measuring section, and a planar slide movably disposed over said aperture and in substantially coplanar and flush sliding relation with the planar wall portion thereat for displacement in one direction to expose the aperture and in the opposite direction to close and block the aperture and seal around the edges thereof, whereby when said container is tilted from an upright position flowable material therein passes through said passage section and a predetermined amount passes into said measuring section and is maintained therein when said container is returned to said upright position for emission through said aperture upon displacement of the slide to open said aperture.

* * * * *